Oct. 30, 1951 G. L. WHITE ET AL 2,573,077
TRACTOR SEAT
Filed Oct. 10, 1945 3 Sheets-Sheet 2
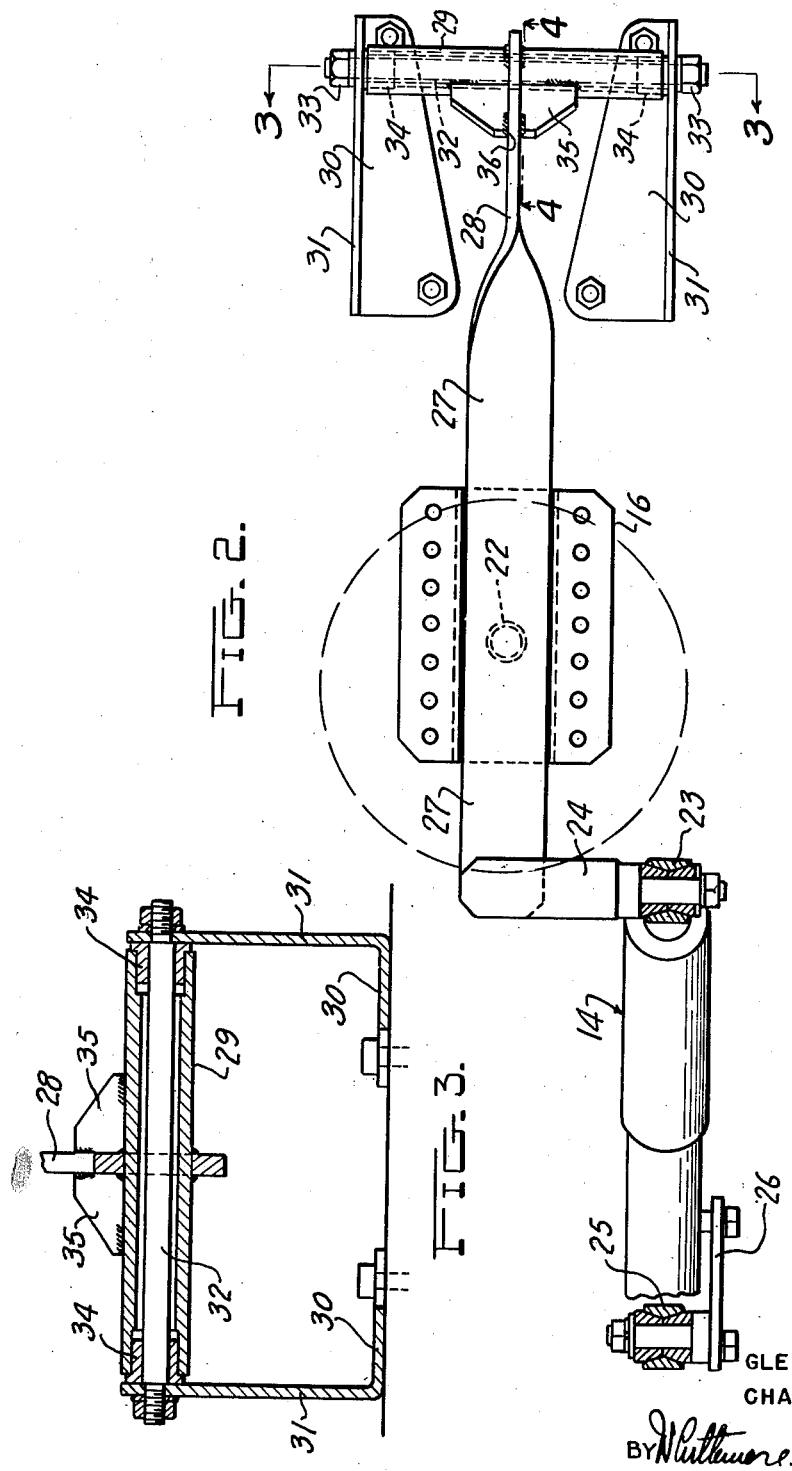
INVENTORS
GLEN L. WHITE
CHARLES E. READ
BY Whittemore, Hulbert & Belknap
ATTORNEYS Oct. 30, 1951 G. L. WHITE ET AL 2,573,077
TRACTOR SEAT
Filed Oct. 10, 1945 3 Sheets-Sheet 3
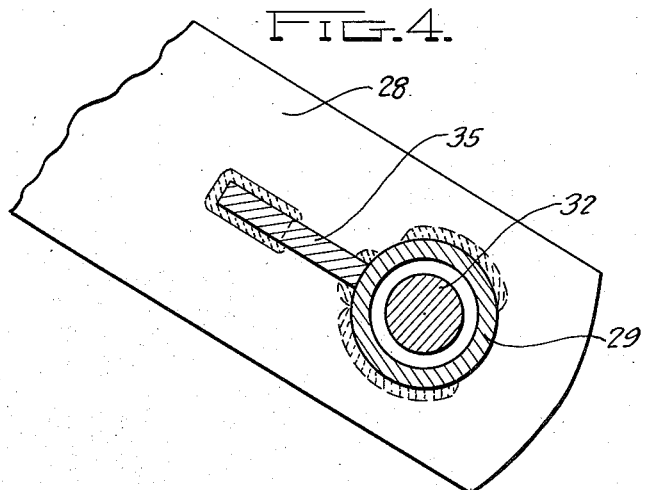
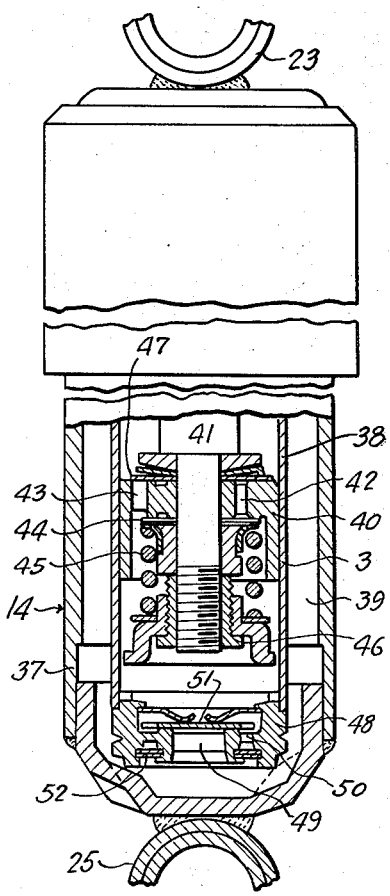
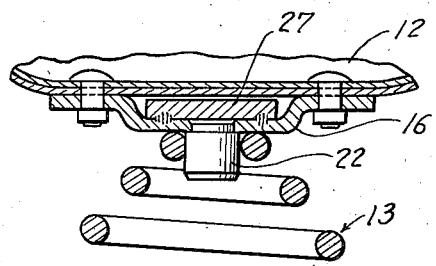
INVENTORS
GLEN L. WHITE
CHARLES E. READ
ATTORNEYS Patented Oct. 30, 1951

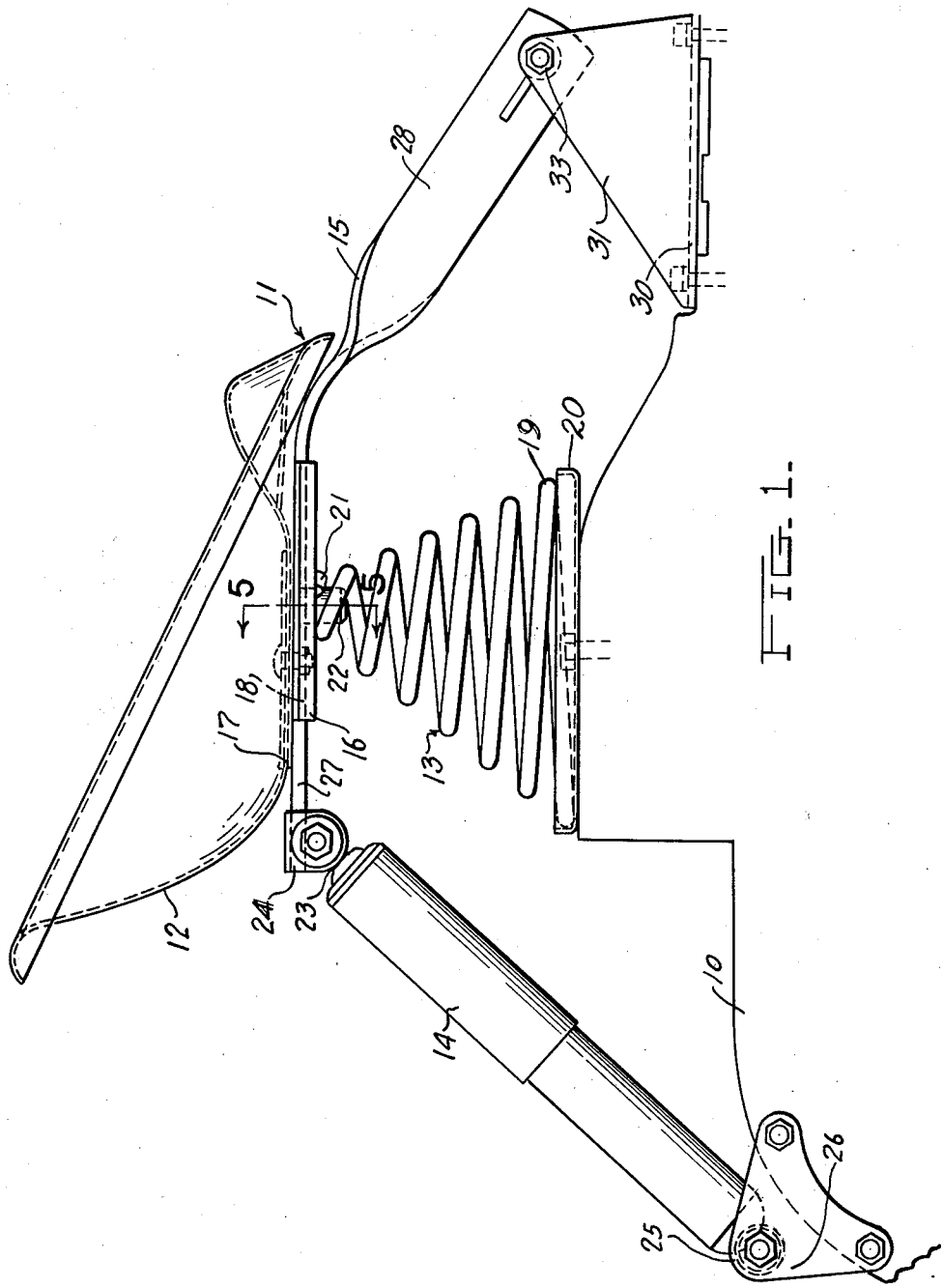

2,573,077

UNITED STATES PATENT OFFICE 2,573,077

TRACTOR SEAT

Glen L. White, Grosse Pointe, and Charles E. Read, Monroe, Mich., assignors to Monroe Auto Equipment Company, Monroe, Mich., a corporation of Michigan Application October 10, 1945, Serial No. 621,454

4 Claims. (Cl. 155—9)

This invention relates generally to vehicle seats and refers more particularly to improvements in seat assemblies of the type used on tractors or similar vehicles.

It has been proposed to improve generally the riding characteristics of tractors by providing a seat assembly having a spring for supporting the seat proper from the tractor and having a double-acting hydraulic shock absorber for controlling the action of the spring. While such an arrangement greatly improves the riding qualities of the tractor, regardless of the nature of the ground over which the tractor is operated, nevertheless, it does not dampen lateral shocks caused by lurching of the tractor to one side or the other of its normal course of travel. This condition is critical, especially in tractor operation, because such vehicles usually operate over extremely rough ground and are frequently exposed to violent lurching movements to one side or the other of the normal path of travel of the vehicle. The operator is, of course, exposed to the lurching movements of the tractor and is subjected to the shocks resulting therefrom, regardless of the effectiveness of the spring suspension assembly provided for the seat.

One of the objects of this invention is to provide a seat assembly embodying means for dampening shocks resulting from sidewise lurching movements of the tractor in combination with means for controlling vertical displacement of the seat relative to the tractor. Thus, the operator is afforded the optimum ride under all conditions of operation and fatigue ordinarily caused by pitching or lurching of the seat is reduced to a minimum.

Another object of this invention is to support the seat on one end of a wide, relatively narrow, spring metal bar having the opposite end pivoted to a part of the tractor in a manner to guide the seat during vertical deflection of the latter. The bar is twisted intermediate the ends so that the seat supporting end lies in a substantially horizontal plane parallel to the bottom of the seat and the pivoted end portion lies in a substantially vertical plane. The dimensions of the bar are predetermined, so that it possesses the requisite strength to effectively guide the seat throughout its vertical travel and, at the same time, is sufficiently resilient to permit limited lateral deflection of the seat when the tractor lurches to one side or the other of its normal path of travel.

The foregoing as well as other objects will be made more apparent as this description proceeds, especially when considered in connection with the accompanying drawings, wherein:

Figure 1 is a side elevation of a part of a tractor having a seat assembly embodying the features of this invention;

Figure 2 is a plan view of the construction shown in Figure 1;

Figure 3 is a sectional view taken substantially on the plane indicated by the line 3—3 of Figure 2;

Figure 4 is a cross sectional view taken on the line 4—4 of Figure 2;

Figure 5 is a fragmentary sectional view taken substantially on the line 5—5 of Figure 1; and Figure 6 is a fragmentary sectional view of a typical shock absorber.

Referring now more in detail to the drawings, it will be noted that the reference character 10 in Figure 1 indicates a supporting part of a tractor and the numeral 11 designates a seat assembly for the tractor. The seat assembly 11 comprises a seat 12, a spring 13, a direct-acting hydraulic shock absorber of the tubular type 14, and a guide bar 15.

The seat 12 is of the saddle type and is preferably formed of a sheet metal stamping. A plate 16 is riveted, welded or otherwise permanently secured to the bottom surface of the base portion 17 of the seat and is depressed intermediate the opposite side edges thereof to form a longitudinally extending channel 18.

The seat 12 is supported above the part 10 of the tractor by means of the spring 13, which is shown in Figure 1 of the drawings as being in the form of a variable rate coil spring. This spring is positioned directly beneath the seat 12 with the convolution 19 of greatest diameter supported on the tractor by a retainer 20. In accordance with conventional practice, successive convolutions of the spring 13 decrease in diameter from the lowermost convolution 19 to the uppermost convolution 21. The arrangement is such that when the coil spring 13 is compressed, the convolutions thereof nest within one another and thereby enable obtaining maximum spring deflection in the relatively limited space provided between the seat and supporting part 10. Also, the variable rate spring provides for increasing the resistance to deflection of the seat 12 as the load on the latter increases. This is highly advantageous in that it insures effective suspension of the seat throughout a wide range of loads.

The top coil of the spring 13 abuts the bottom of the plate 16 and is held from lateral shifting movement relative to the plate by means of a pin 22. The pin 22 is suitably secured to the plate 16 and extends downwardly from the latter for engagement in the top coil 21 of the spring. As stated above, the bottom coil 19 of the spring is seated in a retainer and the latter is bolted or otherwise secured to the part 10 of the tractor.

The action of the coil spring 13 is controlled by the tubular direct-acting hydraulic shock absorber 14. One end of the shock absorber 14 is provided with a lug 23 and the latter is pivoted to a bracket 24 which is welded or otherwise secured to the guide 15. The opposite end of the shock absorber is provided with a similar lug 25 and the latter is pivoted to a bracket 26 having a portion bolted or otherwise secured to the supporting part 10 of the tractor.

The guide bar 15 for the seat 12 comprises a wide relatively narrow spring metal bar twisted intermediate the ends throughout approximately ninety degrees to dispose the upper end portion 27 in a substantially horizontal plane and to locate the lower end portion 28 in a vertical plane. The end portion 27 extends through the channel 18 formed in the plate 16 and is welded or otherwise permanently secured to the base of the channel. The free end of the portion 27 projects beyond the rear side of the seat and provides for attaching the shock absorber supporting bracket 24 thereto. The lower extremity of the end portion 28 is apertured to receive a tube 29 and is welded to the tube intermediate the ends of the latter. The tube 29 extends between a pair of brackets 30, which are secured to the supporting part 10 of the tractor in lateral spaced relationship and are provided with vertical flanges 31 respectively projecting beyond opposite ends of the tube. The flanges 31 are formed with aligned openings therethrough for receiving a pin 32, which extends axially through the tube 29 and is threaded at opposite ends for receiving the clamping nuts 33. The pin 32 is of smaller diameter than the internal diameter of the tube and suitable bearings 34 are provided in opposite end portions of the tube to journal the latter on the pin 32. In the present instance, the connection between the guide and the tube is reinforced by a plate 35. The plate 35 is welded or otherwise permanently secured to the tube and is formed with a slot 36 for receiving a portion of the guide 15. The reinforcing plate 35 is also preferably welded to the adjacent portion of the guide in order to provide a rigid construction.

Inasmuch as the lower end of the bar 15 is pivoted on the supporting part 10 of the tractor and the upper end of the bar is secured to the seat, it follows that the seat is guided throughout its vertical travel by the bar. It will also be noted that by twisting the bar intermediate the ends thereof in the manner described, limited lateral deflection of the seat is permitted. This is desirable in that it dampens, to some extent, shocks resulting from lurching movements of the tractor to one side or the other of its normal path of travel. This feature cooperates with the variable rate spring 13 and the shock absorber 14 to impart the ideal riding characteristics to the seat.

Although various different types of tubular direct-acting shock absorbers may be employed in the assembly to control the action of the spring 13, nevertheless, the general type illustrated in Figure 6 of the drawings is preferred. In general, the shock absorber 14 comprises a tubular casing 37 and a cylinder 38 supported within the casing in concentric relation to the latter. The external diameter of the cylinder is sufficiently less than the internal diameter of the casing to provide an annular reservoir chamber 39. The cylinder and chamber 39 are substantially filled with a suitable hydraulic fluid medium and a piston 40 is supported for sliding movement in opposite directions in the cylinder. The piston 40 is connected to the lug 23 at the upper end of the shock absorber by means of a suitable rod 41.

In accordance with conventional practice, fluid is permitted to flow in opposite directions through the piston 40 as the latter reciprocates in the cylinder 38. In this connection, it will be noted that the piston 40 is provided with two series of ports 42 and 43. The flow of fluid through the inner series of ports 42 is controlled by a laminated pressure relief valve 44 clamped to the bottom of the piston by means of a coil spring 45 having the upper end abutting the relief valve and having the lower end engaging a suitable nut 46. The nut 46 is carried by the lower end of the piston rod 41 for adjustment axially of the latter to vary the compression of the spring 45 and thereby regulate the pressure at which the valve 44 opens. The construction is such that the valve 44 restricts to a substantial extent the flow of fluid downwardly through the ports 42 upon upward movement of the piston in the cylinder.

The flow of fluid upwardly through the outer series of ports 43 upon downward movement of the piston 40 is restricted to a lesser extent by a check valve 47 suitably clamped to the top of the piston 40. The check valve 47 prevents the flow of fluid through the ports 43 upon upward movement of the piston and is suitably apertured to enable the fluid to enter the inner series of ports as the piston travels upwardly in the cylinder.

Due to the fact that the piston rod 41 moves to a greater or lesser extent into and out of the cylinder as the piston reciprocates in the cylinder, it is necessary to compensate for the displacement of this rod. As the piston rod 41 moves downwardly into the cylinder, the excess fluid resulting from the displacement of the piston rod 41 is discharged into the reservoir chamber 39 and fluid from the reservoir chamber is admitted to the cylinder to replenish the latter, as the rod moves out of the cylinder in response to upward movement of the piston. The flow of fluid between the reservoir chamber and cylinder is controlled by a valve assembly 48 secured in the bottom of the cylinder 38. This valve assembly has a central opening 49 and has a plurality of ports 50 surrounding the opening 49. The opening 49 is normally closed by a check valve 51 and the ports 50 are normally closed by a laminated pressure relief valve 52.

The above construction is such that as the piston 40 moves upwardly in the cylinder 38, fluid medium from the reservoir 39 flows through the central opening 49 into the lower end of the cylinder to replenish the fluid in the latter. The valve 51 for the central opening opens relatively freely and affords very little resistance to the return flow of fluid to the cylinder. However, when the piston moves downwardly in the cylinder, fluid is by-passed through the ports 50 to the reservoir chamber and the valve 52 controlling the ports restricts to a much greater extent the flow of fluid from the cylinder to the reservoir chamber. It follows from the above brief description that the shock absorber acts to dampen the rebound action of the coil spring 13 and thereby effectively controls the action of this spring.

What we claim as our invention is:

1. A seat assembly for a vehicle having a supporting part, comprising a seat, spring means for supporting the seat above the supporting part, a connection between the seat and supporting part permitting lateral displacement of the seat relative to the supporting part and also permitting up and down movement of the seat relative to said part, said connection comprising a flat spring bar having a portion at the front end extending in a substantially vertical plane and having a portion intermediate the ends twisted to locate the rear end in a substantially horizontal plane, a tube secured intermediate the ends thereof to the front end of the bar in advance of the seat and having the opposite ends journalled on the supporting part, and means for clamping the seat to the horizontal rear end portion of said bar.

2. A seat assembly for a vehicle having a supporting part, comprising a seat, spring means for supporting the seat above the supporting part, a connection between the seat and supporting part permitting lateral displacement of the seat relative to the supporting part and also permitting up and down movement of the seat relative to said part, said connection comprising a flat spring bar having a portion at the front end extending in a substantially vertical plane and having a portion intermediate the ends twisted to locate the rear end in a substantially horizontal plane, means pivotally connecting the front end of the bar to the supporting part in advance of the seat for swinging movement about a substantially horizontal axis, means for clamping the seat to the horizontal portion of the bar adjacent the rear end of the latter, and a tubular direct acting shock absorber having the lower end pivotally connected to the vehicle supporting part and having the upper end pivotally connected to the bar.

3. A seat assembly for a vehicle having a supporting part, comprising a seat having a base portion, a connection between the seat and supporting part permitting lateral displacement of the seat relative to the supporting part and also permitting up and down movement of the seat relative to said part, said connection comprising a flat spring bar having a portion at the front end extending in a substantially vertical plane and having a portion intermediate the ends twisted to locate the rear end in a substantially horizontal plane, means pivotally connecting the front end of the bar to the supporting part in advance of the seat for swinging movement about a substantially horizontal axis, a conical coil spring having one end seated on the supporting part and having the opposite end engaging the horizontal portion of the bar, and means for clamping the base portion of the seat on the horizontal portion of the bar above the upper end of said coil spring.

4. A seat assembly for a vehicle having a supporting part, comprising a seat having a base portion, a connection between the seat and supporting part permitting lateral displacement of the seat relative to the supporting part and also permitting up and down movement of the seat relative to said part, said connection comprising a flat spring bar having a portion at the front end extending in a substantially vertical plane and having a portion intermediate the ends twisted to locate the rear end in a substantially horizontal plane, means pivotally connecting the front end of the bar to the supporting part in advance of the seat for swinging movement about a substantially horizontal axis, a coil spring positioned between the vehicle supporting part and horizontal end portion of the bar intermediate the ends of said horizontal end portion, a tubular direct acting shock absorber having the lower end pivoted to the vehicle supporting part and having the upper end connected to the horizontal portion of the bar, and means for clamping the base portion of the seat on the horizontal end portion of the bar above the coil spring.

GLEN L. WHITE.
CHARLES E. READ.

REFERENCES CITED

The following references are of record in the file of this patent:

UNITED STATES PATENTS

| Number | Name | Date |
|---|---|---|
| 54,245 | Brown | Apr. 24, 1866 |
| 817,682 | Werner | Apr. 10, 1906 |
| 1,145,567 | Danielson | July 6, 1915 |
| 1,229,488 | Lindskoog | June 12, 1917 |
| 1,390,865 | Bangle | Sept. 13, 1921 |
| 1,467,817 | Schultz | Sept. 11, 1923 |
| 1,663,112 | Caslow | Mar. 20, 1928 |
| 1,838,802 | Bischof | Dec. 29, 1931 |
| 2,115,830 | Thiele | May 3, 1938 |
| 2,162,476 | Casper | June 13, 1939 |
| 2,284,352 | Zank | May 26, 1942 |
| 2,470,907 | White et al. | May 24, 1949 |

FOREIGN PATENTS

| Number | Country | Date |
|---|---|---|
| 433,019 | Great Britain | Aug. 7, 1935 |
| 556,818 | France | Apr. 20, 1923 |